C. L. REHN, OF PHILADELPHIA, PENNSYLVANIA.

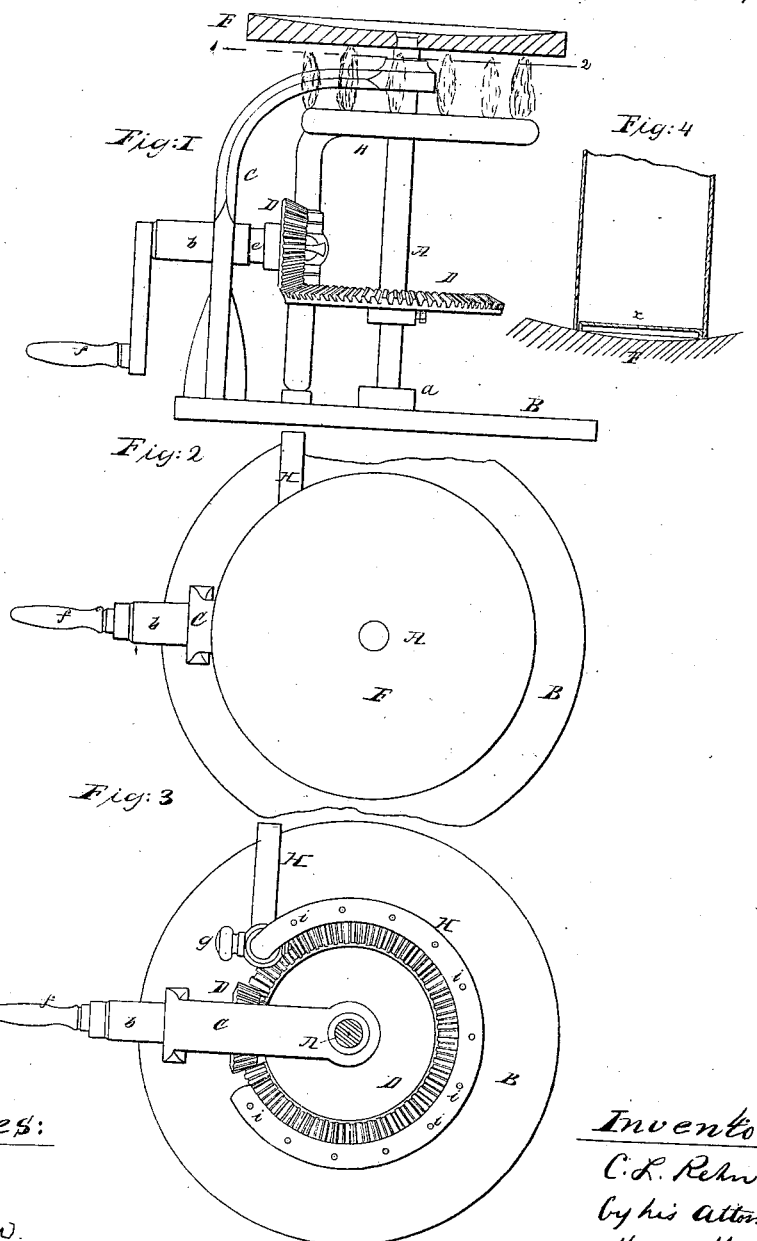

Letters Patent No. 83,208, dated October 20, 1868.

IMPROVEMENT IN MACHINE FOR SOLDERING SHEET-METAL BOXES.

The Schedule referred to in these Letters Patent and making part of the same.

*To all whom it may concern:*

Be it known that I, C. L. REHN, of Philadelphia, Pennsylvania, have invented a Machine for Facilitating the Soldering of Sheet-Metal Boxes; and I do hereby declare the following to be a full, clear, and exact description of the same.

My invention consists of a horizontal disk, concave upon its upper surface, and arranged to revolve above a series of gas-burners, or to be equivalently heated, so as to facilitate the soldering of sheet-metal cans, all in the manner described hereafter.

In order to enable others skilled in the art to make and use my invention, I will now proceed to describe its construction and operation, reference being had to the accompanying drawing, which forms a part of this specification, and in which—

Figure 1 is a side elevation, partly in section, of my machine for facilitating the soldering of sheet-metal boxes;

Figure 2, a plan view of the same;

Figure 3, a sectional plan view on the line 1–2, fig. 1; and

Figure 4, a diagram illustrating my invention.

Similar letters refer to similar parts throughout the several views.

The lower end of a vertical spindle, A, turns in a step, $a$, of a base-plate, B, which is secured, by screws or otherwise, to a table or work-bench, and the upper end of the spindle passes through and turns in a standard, C, secured to the base-plate.

The spindle A is provided with a bevel-wheel, D, which gears into a pinion, D', on a horizontal shaft, E, the latter turning in the standard, and being provided at its outer end with a suitable handle, $f$.

To the upper end of the spindle A is secured a disk, F, which I prefer to make of copper, and the upper surface of which is slightly concave, as shown in fig. 1; and directly beneath this disk, and extending in a circle around the spindle A, is a gas-pipe, H, perforated on its upper side with a number of small holes, $i$, the flow of gas through which is regulated by a cock, $g$.

In the sheet-metal box represented in fig. 4, it will be seen that the bottom $x$ has a flange extending around it, and that it is inserted into the box until the flange is flush with the lower edge of the body of the box.

If, after thus inserting the bottom, an ordinary soldering-iron were applied, the operation would, in making a number of boxes, involve a considerable loss of time and waste of solder.

This objection has been partially obviated by placing the solder upon a stationary plate sufficiently concave to hold it, and maintaining the solder in a state of fusion by heat applied to the plate from beneath. The boxes are then placed upon the plate, as shown in fig. 4, and turned around, by hand, until sufficient solder adheres to them to complete the joint.

It has been found, however, that although this plan effects a considerable saving of solder, almost as much time is consumed in turning the boxes as would be required to run a soldering-iron around them.

In my machine the disk F is first heated sufficiently by the gas-jets to melt the solder contained upon it, and it is then slowly turned, by means of the handle $f$ and the gearing described. The boxes are placed, one at a time, upon the disk, with their lower edges immersed in the solder, where they are held for an instant, and then removed, the operation being more effectual and expeditious than either of the usual methods.

I claim as my invention, and desire to secure by Letters Patent—

The concave disk F, arranged to revolve above a series of gas-burners, or equivalent heaters, as and for the purpose herein set forth.

In testimony whereof, I have signed my name to this specification in the presence of two subscribing witnesses.

C. L. REHN.

Witnesses:
JOHN WHITE,
W. J. R. DELANY.